No. 615,901. Patented Dec. 13, 1898.
I. F. RANDOLPH.
BICYCLE.
(Application filed Jan. 25, 1897.)
(No Model.)
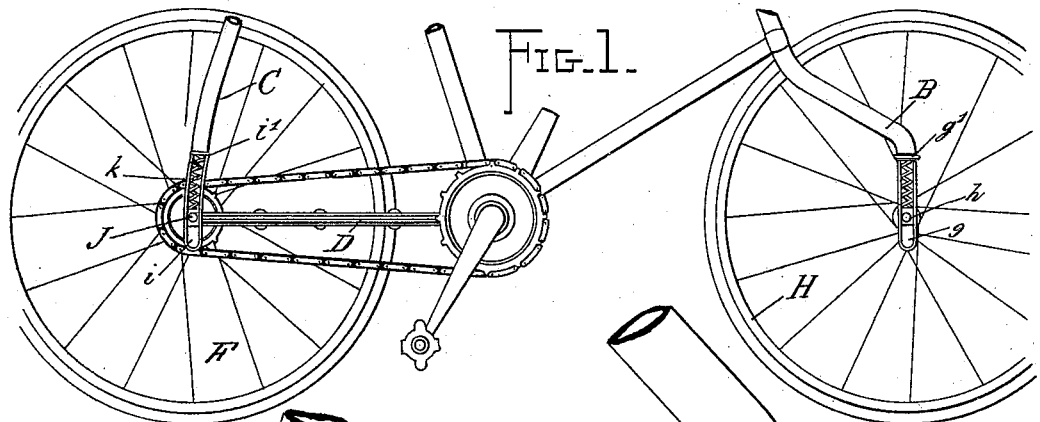
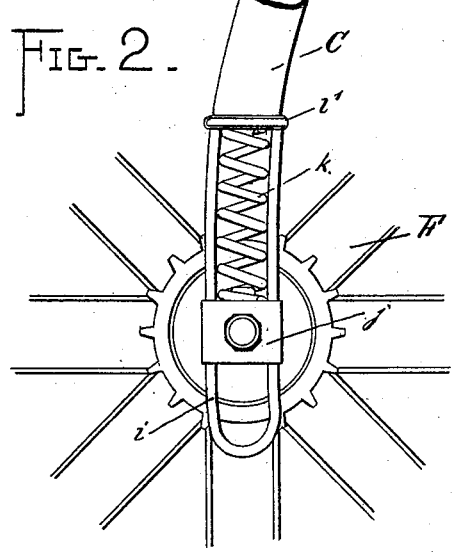
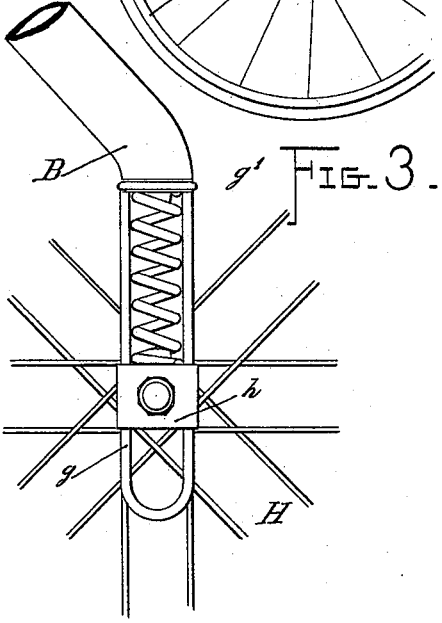
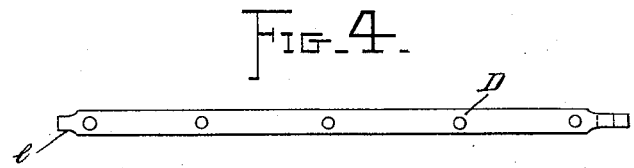
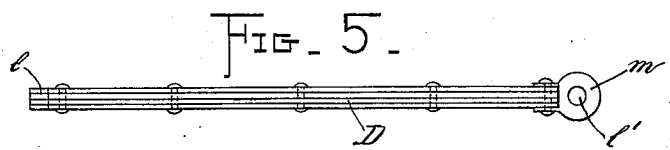
WITNESSES
INVENTOR
Ira F. Randolph
By John Hetherburn
Attorney

UNITED STATES PATENT OFFICE.

IRA F. RANDOLPH, OF CHICAGO, ILLINOIS.

BICYCLE.

SPECIFICATION forming part of Letters Patent No. 615,901, dated December 13, 1898.

Application filed January 25, 1897. Serial No. 620,605. (No model.)

*To all whom it may concern:*

Be it known that I, IRA F. RANDOLPH, a citizen of the United States, residing at Chicago, in the county of Cook and State of Illinois, have invented certain new and useful Improvements in Bicycles; and I do hereby declare the following to be a full, clear, and exact description of the invention, such as will enable others skilled in the art to which it appertains to make and use the same.

My invention relates to certain new and useful improvements in bicycles, the object being to provide a spring-frame to absorb vibration and dispense with the employment of pneumatic tires.

To this end my invention consists in certain novel constructions, combinations, and arrangements of parts, as will be hereinafter described, and specifically set forth in the appended claim.

In the accompanying drawings, Figure 1 shows a side elevation of a bicycle embodying my invention. Fig. 2 is a detail view showing a portion of the bicycle-frame and the spring-runs connecting the crank-hanger and rear axle. Fig. 3 is an enlarged detail view showing a portion of the front fork and illustrating the cushion device contained therein. Fig. 4 is a top view of the spring-metal run, and Fig. 5 is a side view thereof.

Referring to the drawings, the letter A designates a bicycle of the usual construction having a diamond frame; B, the front forks of the frame; C, the rear forks thereof, and D the lower runs, which connect the crank-hanger E with the axle of the rear wheel F.

My invention contemplates the provision of a spring-cushion device located in the front and rear forks and also the provision of spring lower runs to take the place of the rigid tubular runs ordinarily employed.

In carrying out my invention I construct the lower ends of the front forks B with a reduced loop-shaped slot or guideway $g$, in which the box $h$ of the axle of the front wheel H fits and moves. At the upper end of the guideway is a stop $g'$, and a spiral spring between said stop and box $h$ of the axle constitutes the cushioning device. The lower ends of the rear forks C are also provided with a reduced loop-shaped guideway or slot $i$, in which the box $j$ of the axle of the rear wheel F fits and moves, and this guideway is likewise provided with a stop $i'$ at the upper end thereof. A spiral spring $k$, between the said box of the axle and the stop $i'$, constitutes the cushioning device in this instance.

The lower runs D of the frame, which connect the crank-hanger with the rear fork ends, are not constructed of rigid tubular rods, like the ordinary constructions of safety-bicycles. I substitute, therefore, flat or elliptical-shaped bars of spring metal, provided at one end with a lug or projection $l$, which enters an opening in the crank-hanger and is secured therein. The opposite end of the run is provided with a circular flange extremity $m$, having an opening $l'$, through which the shaft of the rear hub extends. In the present instance I have shown the lower run D constructed in elliptical form, this being deemed preferable.

In operation it will be seen that the spring-cushion devices in the front fork and rear fork and the spring-metal runs D effectually absorb all vibration, so that solid tires may be employed without inconvenience.

Having thus described the invention, what is claimed as new, and desired to be secured by Letters Patent, is—

The combination with a bicycle, of a resilient laminated bottom run connected at one end rigidly to the crank-hanger and free at its opposite end where it is provided with an eye to receive one of the wheel-axles, loop-guides on the lower ends of the rear braces curved in the arc of a circle of which the crank-axle is an approximate center, sliding boxes therein to receive the axle, and springs arranged within the guides to allow the boxes to yield in an upward direction, substantially as described.

In testimony whereof I have signed this specification in the presence of two subscribing witnesses.

IRA F. RANDOLPH.

Witnesses:
JUSTIN WYMAN,
THOMAS MELVILLE.